Oct. 20, 1931.     R. B. OTWELL     1,827,998
HEATER FOR MOTOR VEHICLES
Filed Dec. 1, 1930
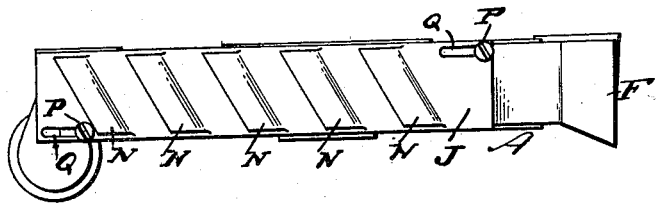
Fig. 1.
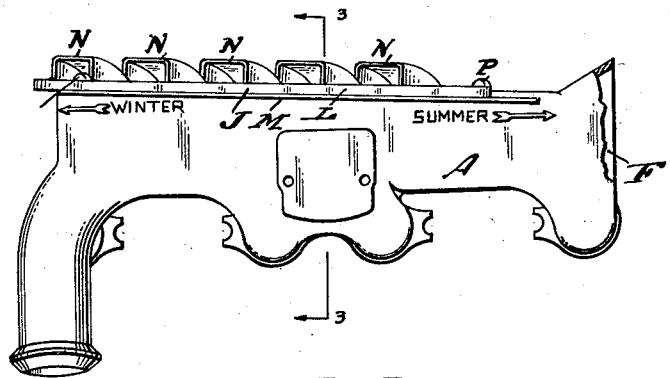 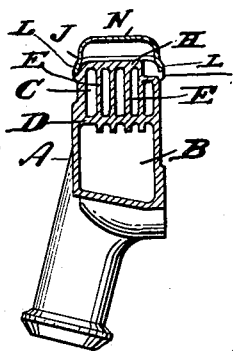
Fig. 2.     Fig. 3.
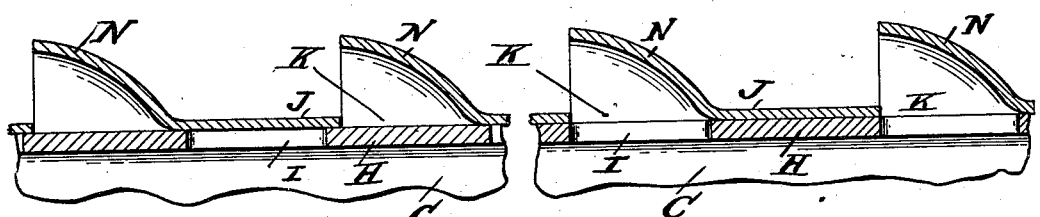
Fig. 4.     Fig. 5.
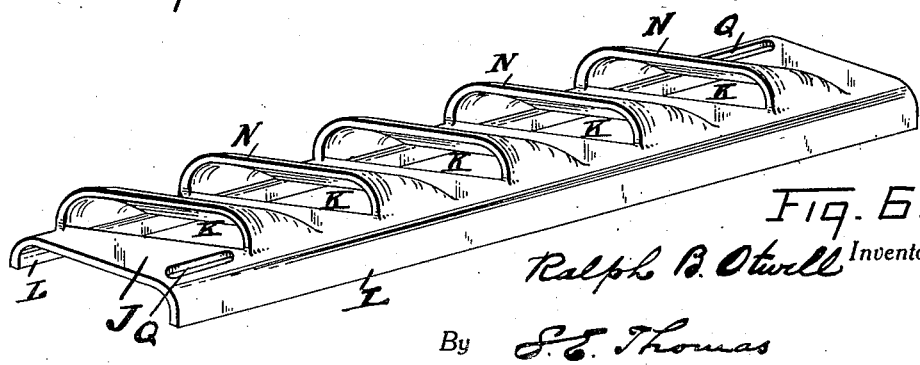
Fig. 6.
Ralph B. Otwell  Inventor
By  S. E. Thomas
Attorney Patented Oct. 20, 1931

1,827,998

UNITED STATES PATENT OFFICE

RALPH B. OTWELL, OF DETROIT, MICHIGAN

HEATER FOR MOTOR VEHICLES

Application filed December 1, 1930. Serial No. 499,185.

My invention relates to a heater for motor driven vehicles, shown in the accompanying drawings, in which the hot gases discharged from an internal combustion engine are utilized to heat air delivered to the vehicle body from an air chamber integral with the exhaust manifold,—the volume of the hot gases in the exhaust manifold being thereby contracted, reducing the back pressure and indirectly increasing the power of the engine.

The primary object of the present invention is to provide means whereby pure warm air—uncontaminated by fumes from the exhaust—may be delivered into the body of the vehicle to heat the latter in cold weather and in warm weather to direct the heated air under the hood, that the hot air so discharged may be drawn through the louvers in the hood to the outside atmosphere, without removal or replacement of the heater, or disturbing the parts—for either summer or winter driving—thereby adding materially to the comfort of the car occupants and the efficiency of the engine.

In putting the foregoing object into effect, a permanently attached slidable plate is mounted upon the upper wall of the heater having a plurality of inclined slots with corresponding overhanging louvers directed toward the usual louvers of the hood—not shown—covering the power plant of the vehicle,—means being provided to secure the slidable louver plate against displacement while permitting its manual longitudinal adjustment along the wall of the heater to effect a registration of the slots in the plate with the corresponding slots in the wall of the heater and the closure of said openings through the wall of the heater as required.

With the foregoing and other objects in view which will appear as the description proceeds, the invention further resides in the combination and arrangement of parts and in the details of construction hereinafter described and claimed; it being understood that changes may be made in the precise embodiment of the invention herein shown without departing from the spirit of the same.

In the drawings accompanying this specification:

Figure 1 is a plan view of a combined heater and exhaust manifold, with the slidable louver plate installed thereon.

Figure 2 is a side elevation of the same.

Figure 3 is a cross-sectional view taken on or about line 3—3 of Figure 2.

Figure 4 is an enlarged fragmentary vertical lognitudinal sectional view through a portion of the upper wall of the heating chamber and the overlapping slidable louver plate, the latter being shown in position to close the vent openings through the wall of the heating chamber that the heated air may pass to the body of the vehicle.

Figure 5 is a similar fragmentary sectional view of the slidable louver plate adjusted in relation to the slotted wall of the air heating chamber to permit the heated air to pass through its slotted openings into the hood of the power plant,—not shown.

Figure 6 is a perspective view of the slidable louver plate detached from the combined heater and exhaust manifold.

Referring now to the letters of reference placed upon the drawings:

A denotes in its entirety a combined exhaust manifold and heater for motor driven vehicles, B indicates the exhaust chamber and C designates the heating chamber, respectively separated by a wall D, extending horizontally between the chambers and integral with the side walls of the heater and exhaust manifold.

E indicates a plurality of vertical longitudinal partition walls, spaced apart to form tunnels extending the entire length of the heating chamber, whereby fresh air entering the chamber through the open funnel-shaped end F, is heated in its passage to the rear of the heating chamber,—which in turn is connected by a hot-air pipe (not shown) with the body of a vehicle.

The upper wall H of the air chamber is formed with a plurality of spaced openings I, closed by a slidable louver plate J supported upon the top of the heating chamber. The louver plate J is provided with a plurality of openings K, adapted upon shifting the plate to register with the openings I in the upper wall of the air heating chamber, that air heated therein may pass from the chamber into and under the usual hood—not shown—covering the engine of a motor vehicle. The slidable louver plate J has downwardly extending flanges L, overlapping the sides of the heating chamber, which rest upon ribs M, projecting from the side walls of the combined heater and exhaust manifold.

N are louvers integral with the plate J, set at an angle to cover the openings in said plate that the air discharged through the openings may be projected by the louvers toward the side walls of the hood housing the engine, whereby the air may be drawn through the louvers formed in the hood to the outer atmosphere.

P P are screws extending through elongated slots Q Q, near the ends of the louver plate to secure the plate when adjusted against displacement or chattering caused by the vibration of the vehicle.

When it is desired to convey the heated air into the body of the vehicle, the louver plate J is adjusted as shown in Figure 4 that it may close the discharge openings through the upper wall of the air heating chamber, the heater being coupled by a pipe, or other suitable connection, with the body of the vehicle through an opening provided in the dash for that purpose.

To shut off the delivery of heated air to the vehicle for summer driving, the pipe connection between the heater and the vehicle may be closed by a suitable valve—not shown—or said pipe may be disconnected. The louver plate is then adjusted to the position indicated in Figure 5,—the slots through the plate registering with the slots in the upper wall of the heating chamber, permitting the heated air to pass directly into and under the hood covering the engine, from whence it is drawn to the outside atmosphere through the usual louvers in the hood, as will be readily understood.

It will be apparent to adapt the device for winter driving requires only the shifting of the louver plate to a position adapted to close the openings through the wall of the air chamber, as indicated in Figure 4,—and that for summer driving the louver plate is adjusted to register with the openings in the upper wall of the air chamber—as indicated in Figure 5,—whereupon the heated air as it is discharged will be projected by the louvers in the slidable plate toward the usual louvers formed in the side walls of the hood covering the engine, through which it is drawn to the outer atmosphere.

Having thus described my invention, what I claim is:

1. A device of the character described, comprising a combined exhaust manifold and air heating chamber constructed of cast metal with the air heating chamber disposed above the exhaust manifold, said air heating chamber and exhaust manifold being separated from each other by a horizontal wall integral with the side walls of the device, the air heating chamber being open at each end for the passage of air, with a plurality of spaced openings through its upper wall for the escape of air heated therein; a slidable plate mounted upon the upper wall of the heating chamber having downwardly directed flanges overlapping the side walls of the device, to secure the plate against lateral displacement, said slidable plate having a plurality of openings spaced apart, whereby upon adjustment of the plate in relation to the heating chamber it may open or close the openings through the upper wall of the chamber; and a plurality of louvers integral with the slidable plate and respectively overhanging the openings through said plate, whereby the heated air discharged through said openings is directed away from said device.

2. A device of the character described, a combined exhaust manifold, an air heating chamber, constructed of cast metal with the air heating chamber disposed above the exhaust manifold, said air heating chamber and exhaust manifold being separated from each other by a horizontal wall integral with the side walls of the device, the air heating chamber being open at each end, with a plurality of spaced openings through its upper wall for the escape of air heated therein; a slidable plate mounted upon the upper wall of the heating chamber having downwardly directed flanges overlapping the side walls of the device, said slidable plate having a plurality of openings spaced apart and extending transversely at an angle to the sides of the plate; a plurality of louvers integral with said plate respectively overlapping said openings, said louvers being adapted to direct air escaping through said openings in a substantially transverse direction in relation to the device, said slidable plate having also elongated slots extending longitudinally at each end of the plate for the passage of screws extending through said slots into the wall of the air chamber whereby said slidable plate may be secured when adjusted and held against accidental displacement from the plate.

3. A device of the character described, comprising an exhaust manifold, with an air heating chamber disposed above but separated from the exhaust manifold by a wall integral with the walls of the device, the upper wall of the hot air chamber having a plurality of spaced openings extending transversely at an angle to the side walls of the heating chamber; a plate slidable upon the wall of the heating chamber, having a plurality of spaced openings extending at an angle to the side walls of the air chamber and registrable with the inclined openings through the wall of the air chamber, whereby upon the adjustment of the slidable plate air heated in said chamber may either escape from the chamber before entering the body of the vehicle, or be delivered to the body of the vehicle to heat the latter, said slidable plate formed also with inclined louvers overhanging the respective openings in the plate whereby upon adjusting the plate so that its openings may be in registration with the inclined openings in the air chamber, heated air in said chamber is released and directed toward louvers in the side walls of a hood overhanging the power plant of a motor vehicle.

4. In a device of the character described, an air chamber, heated by the exhaust gases of an internal combustion engine and adapted for connection with the body of a motor driven vehicle, said air heating chamber having a plurality of spaced openings through which the heated air may escape before reaching the body of the vehicle; and a slidable plate mounted upon the wall of the air heating chamber having a plurality of openings with overhanging louvers spaced apart, whereby upon adjustment of the plate in relation to the plurality of spaced openings in the wall of the chamber, said openings may be either closed to deliver the heated air into the body of the vehicle, or opened that the heated air discharged through said openings may be directed by the louvers away from the device.

5. A device of the character described, comprising a combined exhaust manifold and a air heating chamber, with the air heating chamber disposed above the exhaust chamber and open at each end for the passage of air, said air heating chamber having a plurality of spaced openings through its upper wall for the escape of heated air therethrough, a slidable plate adapted to close said openings mounted upon the wall of the heating chamber, having a plurality of openings with overhanging louvers adapted to register with the spaced openings of the heating chamber, whereby when the openings in the plate are brought into registration with the openings in the heating chamber, the heated air is directed by the louvers away from the device.

In testimony whereof, I sign this specification.

RALPH B. OTWELL.